(12) United States Patent
Tsumura et al.

(10) Patent No.: US 11,077,641 B2
(45) Date of Patent: *Aug. 3, 2021

(54) FIREPROOF CONSTRUCTION AND METHOD FOR USING SAME

(71) Applicant: NICHIAS CORPORATION, Tokyo (JP)

(72) Inventors: Daisuke Tsumura, Tokyo (JP); Akio Tsuzuku, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 760 days.

This patent is subject to a terminal disclaimer.

(21) Appl. No.: 15/513,197

(22) PCT Filed: Aug. 26, 2015

(86) PCT No.: PCT/JP2015/004293
§ 371 (c)(1),
(2) Date: Mar. 22, 2017

(87) PCT Pub. No.: WO2016/047041
PCT Pub. Date: Mar. 31, 2016

(65) Prior Publication Data
US 2017/0297298 A1    Oct. 19, 2017

(30) Foreign Application Priority Data

Sep. 22, 2014  (JP) .............................. JP2014-192888

(51) Int. Cl.
*B32B 5/18* (2006.01)
*G21D 1/00* (2006.01)
(Continued)

(52) U.S. Cl.
CPC .................. *B32B 5/18* (2013.01); *A62C 3/16* (2013.01); *C04B 35/80* (2013.01); *C09K 21/04* (2013.01);
(Continued)

(58) Field of Classification Search
CPC ....... B32B 2307/306; B32B 5/18; B32B 5/26; B32B 2307/304; B32B 2003/326; C09K 21/04

See application file for complete search history.

(56) References Cited

U.S. PATENT DOCUMENTS 4,612,239 A * 9/1986 Dimanshteyn ....... A62D 1/0007
156/326
6,572,948 B1   6/2003 Dykhoff
(Continued)

FOREIGN PATENT DOCUMENTS

JP   S59-102856 A   6/1984
JP   S61-186256 A   8/1986
(Continued)

OTHER PUBLICATIONS

Fukushiro, Sojiro, "Kotainetsu Teinetsudendo Dannetsuzai no Kaihatsu.", Nichias Gijutsu Jiho, No. 364, pp. 1-5, (2014).
(Continued)

*Primary Examiner* — Prashant J Khatri
*Assistant Examiner* — Daniel P Dillon
(74) *Attorney, Agent, or Firm* — Oliff PLC

(57) ABSTRACT

A fireproof structure includes: a first heat-absorbing material that includes an inorganic porous formed body that has absorbed water, or a second heat-absorbing material that includes particles that include magnesium phosphate hydrate and a binder; and a fibrous heat-insulating material that includes inorganic fibers having a shrinkage ratio of 5% or less when allowed to stand at 1,100° C. for 24 hours.

15 Claims, 5 Drawing Sheets

(51) Int. Cl.
*A62C 3/16* (2006.01)
*F16L 59/02* (2006.01)
*G21D 3/04* (2006.01)
*C04B 35/80* (2006.01)
*E04B 1/94* (2006.01)
*C09K 21/04* (2006.01)
*E04B 1/76* (2006.01)

(52) U.S. Cl.
CPC ............... *E04B 1/76* (2013.01); *E04B 1/94* (2013.01); *F16L 59/02* (2013.01); *G21D 1/00* (2013.01); *G21D 3/04* (2013.01); *B32B 2307/304* (2013.01); *B32B 2307/3065* (2013.01); *B32B 2307/72* (2013.01); *B32B 2309/105* (2013.01)

(56) References Cited

U.S. PATENT DOCUMENTS

| | | | | |
|---|---|---|---|---|
| 6,840,994 | B2* | 1/2005 | Krowl | C04B 28/18 106/470 |
| 8,146,298 | B2* | 4/2012 | Bush | A62C 2/06 428/116 |
| 2001/0038938 | A1 | 11/2001 | Takahashi et al. | |
| 2002/0044622 | A1* | 4/2002 | Alsmeyer | G21C 9/016 376/280 |
| 2002/0094426 | A1 | 7/2002 | Stepanian et al. | |
| 2006/0199455 | A1 | 9/2006 | Stepanian et al. | |
| 2009/0229032 | A1 | 9/2009 | Stepanian et al. | |
| 2011/0089363 | A1 | 4/2011 | Ito et al. | |
| 2011/0091721 | A1 | 4/2011 | Ito et al. | |
| 2011/0126957 | A1* | 6/2011 | Wierzbicki | B32B 5/26 156/60 |
| 2012/0100983 | A1* | 4/2012 | Yonaiyama | D01F 9/08 501/153 |
| 2012/0107547 | A1* | 5/2012 | Fernando | B32B 5/24 428/76 |
| 2016/0305597 | A1 | 10/2016 | Ito et al. | |
| 2017/0009139 | A1 | 1/2017 | Nakama et al. | |

FOREIGN PATENT DOCUMENTS

| | | |
|---|---|---|
| JP | S63-029324 U | 2/1988 |
| JP | 2001-266814 A | 9/2001 |
| JP | 2004-517222 A | 6/2004 |
| JP | 3130219 U | 3/2007 |
| JP | 2008-129838 A | 6/2008 |
| JP | 2008-274253 A | 11/2008 |
| JP | 2009-191493 A | 8/2009 |
| JP | 2010-126389 A | 6/2010 |
| JP | 2010-126961 A | 6/2010 |
| JP | 2011-084441 A | 4/2011 |
| JP | 2011-085216 A | 4/2011 |
| JP | 2012-072930 A | 4/2012 |
| JP | 2012-149658 A | 8/2012 |
| JP | 2015-048405 A | 3/2015 |
| JP | WO2015121894 A1 | 3/2017 |
| WO | 2012/049858 A1 | 4/2012 |
| WO | 2013/004306 A1 | 1/2013 |

OTHER PUBLICATIONS

Ohmura, Takahiro, "Comparison of Thermal Conductivities of Thermal Insulations by Different Measurement Methods.", Japan Journal of Thermophysical Properties, vol. 21, No. 2, pp. 86-97, (2007).
Sep. 15, 2015 Office Action issued in Japanese Patent Application No. 2014-192888.
Oct. 22, 2015 Office Action issued in Japanese Patent Application No. 2014-192888.
Sep. 29, 2015 International Search Report issued in Patent Application No. PCT/JP2015/004293.
Mar. 28, 2017 IPRP issued in Patent Application No. PCT/JP2015/004293.
Apr. 17, 2018 Partial Supplementary European Search Report issued in Patent Application No. 15843340.9.
Apr. 13, 2021 Office Action issued in Chinese Patent Application No. 201580051159.9.

* cited by examiner

FIREPROOF CONSTRUCTION AND METHOD FOR USING SAME

TECHNICAL FIELD

The invention relates to a fireproof structure and a method for using the same.

BACKGROUND ART

It is necessary to provide heat resistance or fire resistance to a cable that is used in a nuclear plant, a thermal power plant, and the like in view of disaster (e.g., fire) and the like. In Japan, a cable that is used in a nuclear plant is required not to break even when heated up to 1,100° C. for 3 hours.

In a nuclear plant, a cable is covered with about seven or eight layers of a mat that includes aluminum hydroxide and ceramic fibers and is covered with an aluminum film in order to provide the cable with fire resistance, for example. However, this method can be used for only limited areas since the mat laminate is very heavy and bulky.

Therefore, a heat-insulating structure that need not be replaced, can be used in a small area, has a reduced weight, and efficiently insulates heat, has been desired.

Various heat-insulating materials are known (see Patent Literature 1 to 5). Patent Literature 1 and 2 disclose a xonotlite-type calcium silicate formed body as a heat-insulating material. Patent Literature 3 and 4 disclose a heat-insulating formed body that includes silica fine particles. Patent Literature 5 discloses a composite material that includes an aerogel and inorganic fibers. Patent Literature 6 and 7 disclose magnesium phosphate hydrate as a heat-absorbing material.

CITATION LIST

Patent Literature

Patent Literature 1: JP-A-S59-102856
Patent Literature 2: JP-A-S61-186256
Patent Literature 3: JP-A-2011-84441
Patent Literature 4: JP-A-2011-85216
Patent Literature 5: JP-T-2004-517222
Patent Literature 6: JP-A-2008-274253
Patent Literature 7: JP-A-2009-191493

SUMMARY OF INVENTION

A fireproof structure that enables the continuity of a cable even when heated at 1,100° C. (maximum temperature) for 3 hours, is compact, and has a reduced weight, has been desired.

An object of the invention is to provide a novel fireproof structure that can be used even for a nuclear plant in Japan.

The inventors conducted extensive studies, and found that it is difficult to achieve the above object using only one type of heat-insulating material or heat-absorbing material, and the above object can be achieved by combining a plurality of heat-insulating materials or heat-absorbing materials. This finding has led to the completion of the invention.

The invention provides the following fireproof structure.

1. A fireproof structure including:
    a first heat-absorbing material that includes an inorganic porous formed body that has absorbed water, or a second heat-absorbing material that includes particles that include magnesium phosphate hydrate and a binder; and
    a fibrous heat-insulating material that includes inorganic fibers having a shrinkage ratio of 5% or less when allowed to stand at 1,100° C. for 24 hours.

2. The fireproof structure according to 1, wherein the inorganic porous formed body of the first heat-absorbing material is a formed body that includes one inorganic powder, or two or more inorganic powders, selected from a calcium silicate, silica, alumina, vermiculite, mica, cement, and pearlite.

3. The fireproof structure according to 1 or 2, wherein the first heat-absorbing material is packed in a packing material that breaks at 70 to 130° C.

4. The fireproof structure according to any one of 1 to 3, wherein the binder included in the second heat-absorbing material is sodium silicate.

5. The fireproof structure according to any one of 1 to 4, wherein the second heat-absorbing material is held by a heat-resistant cloth having a surface on which aluminum is deposited.

6. The fireproof structure according to any one of 1 to 5, further including:
    a low-thermal-conductivity heat-insulating material that has a thermal conductivity at 400° C. of 0.05 W/(m·K) or less,
    wherein the heat-absorbing material, the low-thermal-conductivity heat-insulating material, and the fibrous heat-insulating material are provided in this order.

7. The fireproof structure according to any one of 1 to 5, further including:
    a low-thermal-conductivity heat-insulating material that has a thermal conductivity at 400° C. of 0.05 W/(m·K) or less,
    wherein the low-thermal-conductivity heat-insulating material, the heat-absorbing material, and the fibrous heat-insulating material are provided in this order.

8. The fireproof structure according to 6 or 7, the fireproof structure being a laminate in which two or three members selected from the heat-absorbing material, the low-thermal-conductivity heat-insulating material, and the fibrous heat-insulating material are stacked, the laminate being packed in a package.

9. A fireproof structure including:
    a low-thermal-conductivity heat-insulating material that has a thermal conductivity at 400° C. of 0.05 W/(m·K) or less; and
    a fibrous heat-insulating material that includes inorganic fibers having a shrinkage ratio of 5% or less when allowed to stand at 1,100° C. for 24 hours.

10. The fireproof structure according to 9, the fireproof structure being a laminate in which the low-thermal-conductivity heat-insulating material and the fibrous heat-insulating material are stacked, the laminate being packed in a package.

11. The fireproof structure according to 8 or 10, wherein the laminate is a combinable unit structure.

12. The fireproof structure according to 8, 10, or 11, wherein the laminate has a density of 200 to 300 kg/m³.

13. The fireproof structure according to any one of 8 and 10 to 12, wherein the laminate has a thickness of 100 to 150 mm.

14. The fireproof structure according to any one of 6 to 13, wherein the low-thermal-conductivity heat-insulating material is a formed body that includes one or more types of inorganic particles selected from silica particles and alumina particles, or a composite material that includes an aerogel and inorganic fibers.

15. The fireproof structure according to 14, wherein the formed body that includes the inorganic particles includes one or more materials selected from reinforcing fibers and a radiation scattering material.

16. The fireproof structure according to any one of 1 to 15, wherein the inorganic fibers having a shrinkage ratio of 5% or less when allowed to stand at 1,100° C. for 24 hours, are ceramic fibers, or bio-soluble fibers having a dissolution rate of 1% or more with respect to a physiological saline solution.

17. The fireproof structure according to any one of 1 to 16, wherein, when a protection target is surrounded by the fireproof structure, and heated at 1,100° C. for 3 hours from the outside of the fireproof structure, the protection target that is situated inside the fireproof structure has a surface temperature of 170° C. or less.

18. A method for using the fireproof structure according to any one of 1 to 17, including surrounding a protection target using the fireproof structure according to any one of 1 to 17 so that the fibrous heat-insulating material is situated on the outer side.

19. The method according to 18, wherein the fireproof structure is provided to a surface of a structure.

The invention thus provides a novel fireproof structure.

The fireproof structure according to the invention can also be used for an overseas nuclear plant in addition to a nuclear plant in Japan, and can be used for any places (plants or facilities) where fireproofing measures are required.

DESCRIPTION OF EMBODIMENTS

Figure 1:
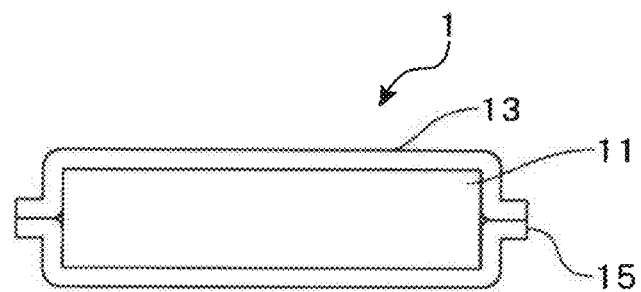
FIG. 1 is a view illustrating an example of a heat-absorbing material used for the fireproof structure according to the invention.

A fireproof structure according to a first embodiment of the invention includes a novel heat-absorbing material, and a heat-insulating material (fibrous heat-insulating material) that exhibits high heat resistance.

The fireproof structure according to the invention preferably further includes a low-thermal-conductivity heat-insulating material that has low thermal conductivity and is provided between the heat-absorbing material and the fibrous heat-insulating material. Specifically, the heat-absorbing material, the low-thermal-conductivity heat-insulating material, and the fibrous heat-insulating material are preferably combined in this order.

The low-thermal-conductivity heat-insulating material, the heat-absorbing material, and the fibrous heat-insulating material may also be combined in this order.

For example, when the fibrous heat-insulating material has first heat resistance and first thermal conductivity, the low-thermal-conductivity heat-insulating material has a second heat resistance that is lower than the first heat resistance, and has a second thermal conductivity that is lower than the first thermal conductivity.

When the fireproof structure includes the heat-absorbing material, the low-thermal-conductivity heat-insulating material, and the fibrous heat-insulating material, the heat-absorbing material may have a thickness of 3 to 50 mm, the low-thermal-conductivity heat-insulating material may have a thickness of 10 to 50 mm, and the fibrous heat-insulating material may have a thickness of 50 to 150 mm, for example. The total thickness of the heat-absorbing material, the low-thermal-conductivity heat-insulating material, and the fibrous heat-insulating material is preferably 100 to 150 mm.

A fireproof structure according to a second embodiment of the invention includes a heat-insulating material (fibrous heat-insulating material) that exhibits high heat resistance, and a low-thermal-conductivity heat-insulating material that has low thermal conductivity.

When the fireproof structure includes the low-thermal-conductivity heat-insulating material and the fibrous heat-insulating material, the low-thermal-conductivity heat-insulating material may have a thickness of 50 to 500 mm, and the fibrous heat-insulating material may have a thickness of 10 to 100 mm, for example. The total thickness of the low-thermal-conductivity heat-insulating material and the fibrous heat-insulating material is preferably 100 to 300 mm.

The fireproof structure according to the invention is used to surround the object to be fireproofed. It is preferable that the fireproof structure surround the entirety of the object to be fireproofed. It suffices that each member included in the fireproof structure surround at least part of the object to be fireproofed.

The heat-absorbing material, the low-thermal-conductivity heat-insulating material, and the fibrous heat-insulating material may be used in a state in which these are separated from each other, or may be used in a state in which two or three members thereof come in contact with each other.

The heat-absorbing material and the low-thermal-conductivity heat-insulating material, or the fibrous heat-insulating material and the low-thermal-conductivity heat-insulating material, or the heat-absorbing material and the fibrous heat-insulating material may be stacked to form a laminate. The heat-absorbing material, the low-thermal-conductivity heat-insulating material, and the fibrous heat-insulating material may be stacked to form a laminate. The laminate may be packed in a package in a state in which the members are stacked without being joined or bonded.

It is preferable that the fibrous heat-insulating material be situated on the outermost side when the fireproof structure is used.

Each of the heat-absorbing material, the low-thermal-conductivity heat-insulating material, and the fibrous heat-insulating material may be of a single layer structure, or a multi-layer stack structure. In the case of a multi-layer stack structure, a plurality of layers thereof may be identical to or different from each other.

The fireproof structure according to the first embodiment of the invention is described below with reference to the drawings taking an example in which the fireproof structure is used for a nuclear plant.

Figure 6:
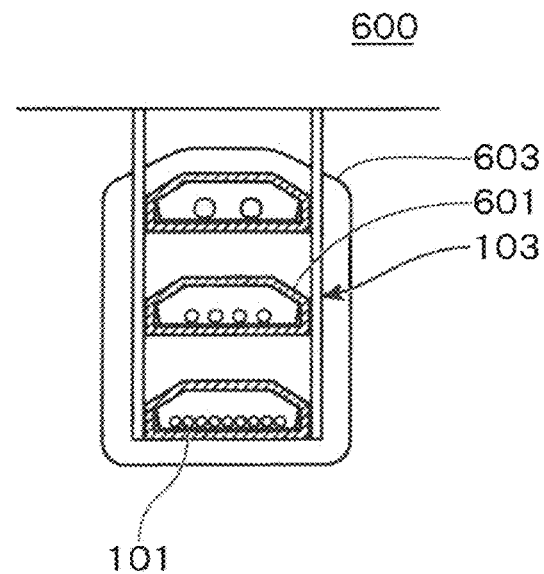
FIG. 6 is a vertical cross-sectional view illustrating the fireproof structure produced in Example 2.

As illustrated in FIG. 6, cables 101 used in a nuclear plant are often placed on a multi-stage rack 103 that is suspended from the ceiling. A fireproof structure 600 illustrated in FIG. 6 includes a heat-absorbing material 601, and a laminate 603 that includes a fibrous heat-insulating material and a low-thermal-conductivity heat-insulating material. As illustrated in FIG. 6, the entirety of the cables placed in each stage is surrounded by the heat-absorbing material 601, and the entire rack is surrounded by the laminate 603. When the fibrous heat-insulating material and the low-thermal-conductivity heat-insulating material are placed one top of the other, and packed in a package (e.g., cloth) in the form of a mat, it is possible to easily handle the fibrous heat-insulating material and the low-thermal-conductivity heat-insulating material. For example, the mat is provided to surround the rack 103, temporarily secured using a string bonded to the mat, and then secured using an SUS band or the like. The thickness of the mat can be reduced to 100 mm or less. Therefore, the mat can be used for a rack that is placed in a small area. The thickness of the fibrous heat-insulating material is 3 to 100 mm, and the thickness of the low-thermal-conductivity heat-insulating material is 3 to 100 mm, for example.

Although FIG. 6 illustrates an example in which the entirety of the cables (object to be fireproofed) is surrounded by the heat-absorbing material, part of the cables may not be surrounded by the heat-absorbing material depending on the shape of the rack, and the like.

It is preferable to prevent a situation in which an excessive load is applied to the rack as a result of providing the fireproof structure. When the rack is a three-stage rack, the weight of the fireproof structure may be 150 kg or less or 120 kg or less per meter of the cable. When the rack is a single-stage rack, the weight of the fireproof structure may be 100 kg or less or 80 kg or less per meter of the cable.

When the rack is provided near a wall, the fireproof structure may be used in a state in which the fireproof structure is secured on the wall. A load applied to the rack can be reduced by providing a member that supports the fireproof structure on the wall.

In this case, three members or two members may be assembled as a laminate, or the fibrous heat-insulating material and the low-thermal-conductivity heat-insulating material may be assembled as a unit structure.

The density of the laminate is preferably 200 to 300 kg/m' The thickness of the laminate is preferably 30 to 350 mm, more preferably 50 to 250 mm, and still more preferably 100 to 150 mm.

The fireproof structure according to the invention ensures the continuity of the cables even when heated at 1,100° C. (maximum temperature) for 3 hours in accordance with the ISO 834 standard fire curve. The fireproof structure according to the invention enables the internal temperature to be preferably limited to 170° C. or less, and more preferably 160° C. or less.

The fireproof structure according to the invention can be installed again after the fireproof structure has been removed for cable inspection and the like. In particular, the fireproof structure can be easily reused when two or more members are stacked in the form of a mat, or a unit structure.

Each member is described below.

1. Heat-Absorbing Material (First Heat-Absorbing Material) that Includes Inorganic Porous Formed Body that has Absorbed Water The first heat-absorbing material includes an inorganic porous formed body that has absorbed water (that has been impregnated with water). For example, the first heat-absorbing material is a self-supported formed body such as a board.

Examples of the inorganic porous formed body include a formed body that is obtained by mixing one material, or two or more materials, selected from an inorganic powder (e.g., calcium silicate, silica, alumina, vermiculite, mica, pearlite, and cement), and the like, and processing the mixture.

A calcium silicate formed body is particularly preferable as the inorganic porous formed body. Xonotlite, tobermorite, and wollastonite are preferable as the calcium silicate. Xonotlite is particularly preferable due to high heat resistance. The inorganic porous formed body may further include an inorganic binder, particles, and the like. The calcium silicate formed body may be produced using the method disclosed in Patent Literature 1 or 2.

It is preferable that the inorganic porous formed body have a density of about 40 to about 400 kg/m$^3$ so that the inorganic porous formed body has a reduced weight, can absorb a large amount of water, and exhibits a strength sufficient to maintain the shape retention capability. It is more preferable that the inorganic porous formed body have a density of 80 to 300 kg/m$^3$, and still more preferably 100 to 200 kg/m$^3$.

The formed body may include water in an amount (ratio) of 100 to 400% with respect to the weight of the formed body. The formed body preferably includes water in an amount (ratio) of 130 to 300%, and more preferably 150 to 250%, with respect to the weight of the formed body.

The water that is to be absorbed by the inorganic porous formed body may include various additives (e.g., anti-freeze solution, preservative, and pH-adjusting agent).

It is preferable that the inorganic porous formed body that has absorbed water be packed in a packing material (package).

It suffices that the packing material have a sealing capability that can prevent vaporization of water from the water-containing formed body in an ordinary state. The packing material breaks due to heating, and vaporization of water occurs, so that heat is absorbed due to heat of vaporization.

It is preferable that the breakage temperature of the packing material due to heating be equal to or lower than the boiling point of water. If the breakage temperature of the packing material is equal to or higher than the boiling point of water, the packing material may explode. If the breakage temperature of the packing material is considerably lower than the boiling point of water, the packing material may break in an early stage, and vaporization of water may occur, whereby it may be difficult to efficiently obtain a heat-absorbing effect. Therefore, it is more preferable that the breakage temperature of the packing material be 70 to 130° C. It is still more preferable that the breakage temperature of the packing material be 80 to 120° C., and more preferably 90 to 110° C.

A metal or a resin may be used as the packing material in which the inorganic porous formed body that has absorbed water is packed. A laminate in which a metal and a resin are stacked is preferable due to high heat resistance and high strength.

Examples of the metal include an aluminum foil, a copper foil, a tin foil, a nickel foil, a stainless steel foil, a lead foil, a tin-lead alloy foil, a bronze foil, a silver foil, an iridium foil, a phosphor bronze foil, and the like.

A thermosetting resin or a thermoplastic resin may be used as the resin. Examples of the resin include polyethylene, polypropylene, polystyrene, nylon, an acrylic resin, an epoxy resin, polyurethane, polyether ether ketone, polyethylene terephthalate, polyphenylene sulfide, a fluororesin, a polycarbonate, an aramid, and the like. It is preferable to use a resin that breaks at about 100° C.

The thickness of the packing material is not particularly limited, but is preferably 5 to 200 μm, for example. When a laminate (see above) is used, the metal foil may have a thickness of 3 to 12 μm, and the resin layer may have a thickness of 2 to 60 μm.

The packing material may be provided with a mechanism and a structure that release pressure that has been generated inside the package due to heating. For example, the packing material is provided with a part that decreases the adhesion of the bonding area by changing the type or the structure of the film. Alternatively, a hole is formed in the film, and a film having a thickness smaller than that of the package film is bonded (or melt-formed) thereto. This makes it possible to prevent a situation in which the packing material unnecessarily expands when the pressure inside the package has increased, and maintain the original dimensions to a certain extent.

Figure 2:
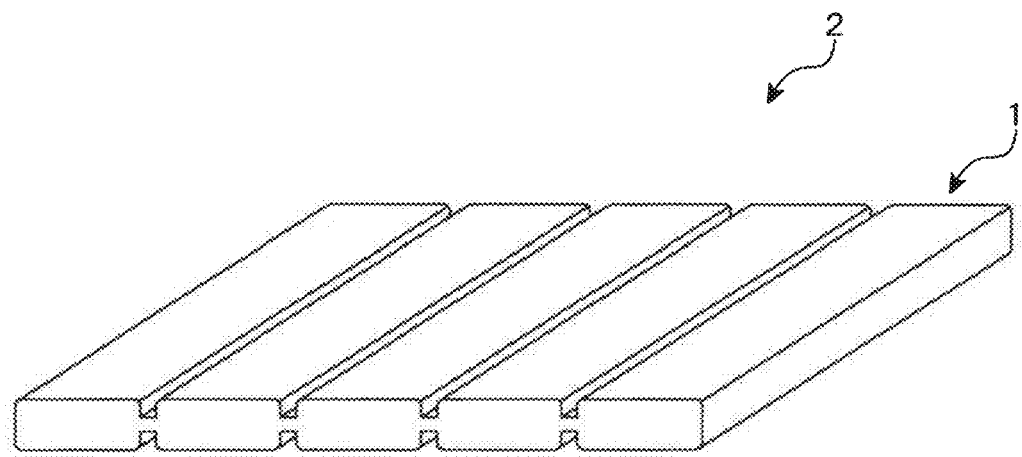
FIG. 2 is a view illustrating another example of a heat-absorbing material used for the fireproof structure according to the invention.

FIG. 1 is a cross-sectional view illustrating an example of the heat-absorbing material: A heat-absorbing material 1 includes a packing material 13 in which an inorganic porous formed body 11 that has absorbed water is packed. The heat-absorbing material illustrated in FIG. 1 may be used directly, or a plurality of heat-absorbing materials illustrated in FIG. 1 may be connected (see FIG. 2). The heat-absorbing material illustrated in FIG. 2 in which a plurality of heat-absorbing materials are connected can be folded or rolled when the heat-absorbing material is carried to a small area. Moreover, the heat-absorbing material illustrated in FIG. 2 can be placed to fit the shape of the object to be fireproofed.

The inorganic porous formed body included in the heat-absorbing material also functions as an excellent heat-insulating material after water has been removed from the inorganic porous formed body.

2. Heat-Absorbing Material (Second Heat-Absorbing Material) that Includes Particles that Include Magnesium Phosphate Hydrate and Binder (e.g., Glass)

The second heat-absorbing material includes particles that include magnesium phosphate hydrate and a binder.

Examples of the magnesium phosphate hydrate include trimagnesium phosphate octahydrate ($Mg_3(PO_4)_2 \cdot 8H_2O$), trimagnesium phosphate trihydrate, trimagnesium phosphate pentahydrate, trimagnesium phosphate decahydrate, and trimagnesium phosphate 22-hydrate. Among these, trimagnesium phosphate octahydrate is preferable. Magnesium phosphate hydrate decomposes at about 100° C., and undergoes an endothermic reaction.

An inorganic binder and an organic binder may be used as the binder.

Examples of the inorganic binder include sodium silicate (sodium silicate derived from water glass, $Na_2SiO_3$, $Na_2O \cdot SiO_2$, or $Na_2O \cdot nSiO_2 \cdot mH_2O$), colloidal silica, bentonite, and the like. Among these, sodium silicate is preferable.

Examples of the organic binder include polyvinyl alcohol (PVA), carboxymethyl cellulose (CMC), starch, and the like.

The heat-absorbing material may consist of magnesium phosphate hydrate and the binder, excluding unavoidable impurities.

The particles normally include 1 to 99 wt of magnesium phosphate hydrate and 1 to 99 wt % of the binder, preferably include 50 to 99 wt % of magnesium phosphate hydrate and 1 to 50 wt % of the binder, and more preferably include 70 to 99 wt % of magnesium phosphate hydrate and 1 to 30 wt % of the binder.

The heat-absorbing material is used in the form of particles. When magnesium phosphate hydrate is used in the form of powder, it is difficult to pack magnesium phosphate hydrate in the package (e.g., it is difficult seal the package), and magnesium phosphate hydrate easily unevenly distributed in a lower area within the package. The average particle size of the particles is preferably 0.01 to 20 mm, and more preferably 0.1 to 15 mm. The surface area of the particles increases (i.e., the particles are excellent as a heat-absorbing material) as the particle size of the particles decreases. On the other hand, handling may become difficult as the particle size of the particles decreases.

The heat-absorbing material is normally used in a state in which the particles are placed in a container (e.g., bag or case). It is preferable to place (pack) the particles in a bag-shaped heat-resistant cloth (e.g., fabric, sheet, or film), and close the bag-shaped heat-resistant cloth. Examples of the heat-resistant cloth include a glass cloth, a silica cloth, an alumina cloth, and the like. It is preferable to use a cloth having a surface on which aluminum is deposited due to excellent fire resistance. The container need not have seal-tightness.

Figure 3:
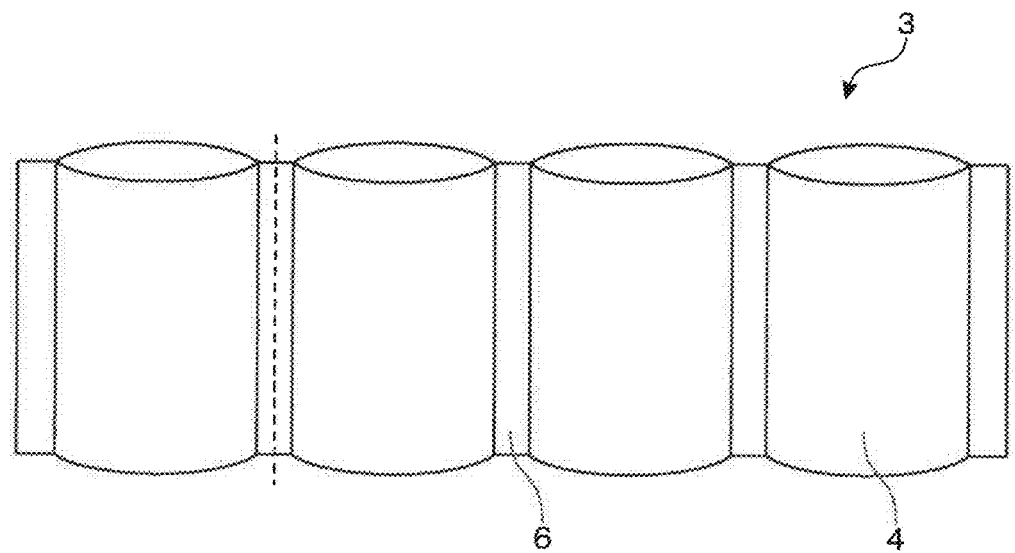
FIG. 3 is a perspective view illustrating an example of a bag used for a heat-absorbing material that is used for the fireproof structure according to the invention.

FIG. 3 is a perspective view illustrating an example of a bag that is used for the heat-absorbing material. A bag 3 has a configuration in which a plurality of bags 4 are arranged side by side and connected through a connection part 6. The particles are put in the bag 3 through the upper opening, and the bag 3 is closed. A bag having such a structure can be folded or rolled when the bag is carried to a small area. Moreover, the bag can be placed to fit the shape of the object to be fireproofed. The bag 3 may be cut along the dotted line illustrated in FIG. 3 (i.e., may be cut in the area of the connection part 6 that connects the bags 4).

The particles used for the heat-absorbing material may be obtained by mixing magnesium phosphate hydrate and water glass ($Na_2O \cdot nSiO_2 \cdot mH_2O$), subjecting the mixture to a granulation process to obtain water-containing particles, and removing water from the water-containing particles. The resulting particles are placed in a container, as required.

3. Fibrous Heat-Insulating Material

A heat-insulating material that exhibits high heat resistance is used as the fibrous heat-insulating material. It is preferable that the fibrous heat-insulating material have a shrinkage ratio of 0 to 5% when allowed to stand at 1,100° C. for 24 hours. It is more preferable that the fibrous heat-insulating material have a shrinkage ratio of 0 to 3% when allowed to stand at 1,100° C. for 24 hours. The shrinkage ratio is measured using the method described later in connection with the examples.

Ceramic fibers may be used as the fibrous heat-insulating material. For example, fibers that are formed of silica and alumina (silica:alumina=40:60 to 0:100), such as silica-alumina fibers, mullite fibers, and alumina fibers, may be used.

Bio-soluble fibers that exhibit high heat resistance may also be used taking account of health and safety with respect to workers.

The bio-soluble fibers normally include silica and/or alumina, and one or more material selected from an alkali metal oxide (e.g., $Na_2O$ and $K_2O$), an alkaline-earth metal oxide (e.g., CaO), magnesia, zirconia, and titania, as the main components. The bio-soluble fibers may also include other oxides.

For example, the bio-soluble fibers may have the following composition.
$SiO_2$, $ZrO_2$, $Al_2O_3$, and $TiO_2$: 50 to 82 wt % in total
Alkali metal oxide and alkaline-earth metal oxide: 18 to 50 wt % in total Alternatively, the bio-soluble fibers may have the following composition.
$SiO_2$: 50 to 82 wt %
CaO and MgO: 10 to 43 wt % in total More specifically, the bio-soluble fibers may have the following composition 1 or 2.
Composition 1
$SiO_2$: 70 to 82 wt %
CaO: 1 to 9 wt %
MgO: 10 to 29 wt %
$Al_2O_3$: less than 3 wt %
Composition 2
$SiO_2$: 70 to 82 wt %
CaO: 10 to 29 wt %
MgO: 1 wt % or less
$Al_2O_3$: less than 3 wt %

The composition 2 is preferable since high solubility is obtained even after heating.

Fibers having the following composition exhibit particularly high heat resistance.

Inorganic fibers that include $SiO_2$, MgO, and CaO as the main components, and have the following composition.
$SiO_2$: 73.6 to 65.9 wt %
MgO: 9.0 to 15.0 wt %
CaO: 5.1 to 12.4 wt %
$Al_2O_3$: 0 wt % or more and less than 2.3 wt %
$Fe_2O_3$: 0 to 0.50 wt %
SrO: less than 0.1 wt %

The expression "include $SiO_2$, MgO, and CaO as the main components" means that the $SiO_2$ content (wt %), the MgO content (wt %), and the CaO content (wt %) in the inorganic fibers are higher than the content (wt %) of the remaining components (i.e., $SiO_2$, MgO, and CaO are components of which the content is highest, second highest, or third highest).

It is preferable that the fibrous heat-insulating material be in the shape of a blanket or a board from the viewpoint of handling capability. An ordinary additive such as an inorganic binder or an organic binder may be appropriately used when producing such a formed article.

The thickness of the fibrous heat-insulating material may be appropriately selected (determined) taking account of the member(s) other than the fibrous heat-insulating material, and the installation site. When the low-thermal-conductivity heat-insulating material is not provided, the thickness of the fibrous heat-insulating material is normally 100 to 300 mm. When the low-thermal-conductivity heat-insulating material is provided, it is possible to easily to reduce the size of the entire fireproof structure while providing the desired fire resistance by setting the thickness of the fibrous heat-insulating material to 25 to 50 mm.

4. Low-Thermal-Conductivity Heat-Insulating Material

A heat-insulating material that has low thermal conductivity is used as the low-thermal-conductivity heat-insulating material.

For example, a formed body that includes one or more types of inorganic particles selected from alumina particles and silica particles, and has a thermal conductivity at 400° C. of 0.05 W/(m·K) or less, may be used as the low-thermal-conductivity heat-insulating material.

The thermal conductivity of the low-thermal-conductivity heat-insulating material is preferably 0.045 W/(m·K) or less, and more preferably 0.035 W/(m·K) or less. The lower limit of the thermal conductivity of the low-thermal-conductivity heat-insulating material is not particularly limited. For example, the lower limit of the thermal conductivity of the low-thermal-conductivity heat-insulating material is 0.02 W/(m·K) or more. It is preferable that the low-thermal-conductivity heat-insulating material have a thermal conductivity at 800° C. of 0.05 W/(m·K) or less. The lower limit of the thermal conductivity at 800° C. thereof is 0.02 W/(m·K) or more, for example. The thermal conductivity is measured using the method described later in connection with the examples.

More specifically, a formed body that includes one or more types of inorganic particles selected from silica particles having an average primary particle size of 100 nm or less, and alumina particles having an average primary particle size of 100 nm or less, may be used.

The average particle size is calculated from the particle sizes of about one hundred randomly selected particles measured using a transmission electron microscope (TEM) or a field emission scanning electron microscope (FE-SEM).

The average particle size of the inorganic particles may be 50 nm or less, or may be 30 nm or less. The lower limit of the average particle size of the inorganic particles is not particularly limited, but is 2 nm or more, for example.

It is preferable that the alumina particles do not include α-alumina (corundum) (e.g., a peak of corundum is not detected when subjected to XRD measurement).

Fumed silica or fumed alumina particles may be used as the inorganic particles. The inorganic particles are used in an amount of 52 to 93 mass %, for example.

The formed body may include reinforcing fibers that reinforce the formed body, and a radiation scattering material that reduces heat transfer due to radiation, in addition to the inorganic particles.

The reinforcing fibers are one or more types of fibers selected from the group consisting of glass fibers, silica-alumina fibers, silica-alumina-magnesia fibers, silica fibers, alumina fibers, zirconia fibers, bio-soluble inorganic fibers, rock wool, and basalt fibers, for example. The reinforcing fibers are used in an amount of 1 to 20 mass %, for example.

The radiation scattering material is one or more materials selected from the group consisting of silicon carbide, zirconia, zirconium, zirconium silicate, titania, silicon nitride, iron oxide, chromium oxide, zinc sulfide, and barium titanate, for example. The radiation scattering material is used in an amount of 1 to 40 mass %, for example.

When the formed body is produced using alumina particles, it is preferable that the formed body include a crystal transformation-inhibiting material in order to reduce or suppress shrinkage due to crystallization. The crystal transformation-inhibiting material is used in an amount of about 1 to 45 mass %, for example.

Examples of the crystal transformation-inhibiting material include a phosphorus compound, a Group 2 element compound, a lanthanum compound, a yttrium compound, silica particles, silica stone, talc, mullite, silicon nitride, silica fume, wollastonite, bentonite, kaolin, sepiolite, and mica particles.

An inorganic phosphorus compound and/or an organic phosphorous compound may be used as the phosphorus compound. Examples of the phosphorus compound include aluminum phosphate (e.g., aluminum dihydrogen phosphate ($Al(H_2PO_4)_3$), hexagonal aluminum phosphate ($AlPO_4$), and rhombic aluminum phosphate ($AlPO_4$)), magnesium phosphate (e.g., magnesium dihydrogen phosphate tetrahydrate ($Mg(H_2PO_4)_2.4H_2O$), and trimagnesium phosphate octahydrate ($Mg_3(PO_4)_2.8H_2O$)), calcium phosphate (e.g., calcium dihydrogen phosphate monohydrate ($Ca(H_2PO_4)_2.H_2O$)), ammonia phosphate (e.g., ammonium dihydrogen phosphate ($NH_4H_2PO_4$), and diammonium hydrogen phosphate (($NH_4)_2HPO_4$)), a phosphine derivative and/or phosphoric acid ester (triphenylphosphine (($C_6H_5)_3P$)), and the like.

The Group 2 element compound is preferably a compound that includes at least one element selected from Ba, Sr, Ca, and Mg, and more preferably a compound that includes at least one element selected from Ba and Sr.

Examples of a Ba compound include barium oxide, barium carbonate, barium hydroxide, barium titanate, and the like. Examples of an Sr compound include strontium oxide, strontium carbonate, strontium hydroxide, and the like. Examples of a Ca compound include calcium oxide, calcium carbonate, calcium hydroxide, tricalcium phosphate, and the like. Examples of an Mg compound include magnesium oxide, magnesium carbonate, magnesium hydroxide, and the like.

Examples of the lanthanum compound include lanthanum carbonate, lanthanum oxide, lanthanum hydroxide, and the like. Examples of the yttrium compound include yttrium carbonate, yttrium oxide, yttrium hydroxide, and the like.

It is preferable to produce the formed body using a combination of alumina particles, the crystal transformation-inhibiting material (e.g., fumed silica), zirconia, and alumina fibers.

The formed body that includes the inorganic particles is normally a compact.

For example, a specific die is filled with a powder mixture (raw materials), and the powder mixture is dry-pressed to obtain a dry compact.

The aerogel-inorganic fiber composite material disclosed in Patent Literature 5 may be used as the low-thermal-conductivity heat-insulating material.

The composite material has a configuration in which an aerogel matrix is reinforced by a nonwoven bat formed of inorganic fibers. Glass fibers, ceramic fibers, and the like may be used as the inorganic fibers. The bio-soluble fibers that may be used for the fibrous heat-insulating material may also be used as the inorganic fibers.

The aerogel may be obtained by removing an interstitial mobile solvent phase from holes of a gel structure having continuous open cells at a temperature higher than the critical temperature of the solvent under a pressure higher than the critical pressure of the solvent. During the solvent extraction process, it is preferable to maintain the pressure and the temperature of the solvent phase to be higher than the critical pressure and the critical temperature. An aerogel typically has low bulk density (about 0.15 g/cc or less, and preferably about 0.03 to 0.3 g/cc), a large surface area (normally about 400 to 1,000 $m^2$/g or more, and preferably about 700 to 1,000 $m^2$/g), high porosity (about 95% or more, and preferably about 97% or more), and a large pore volume (about 3.8 mL/g or more, and preferably about 3.9 mL/g or more). Low thermal conductivity can be obtained by a combination of these properties.

The composite material may be obtained by adding a gel precursor to a reinforcing fiber bat placed in a die, and subjecting the mixture to supercritical drying.

A material of an inorganic aerogel forming the aerogel matrix is an oxide of a metal such as silicon, aluminum, titanium, zirconium, hafnium, yttrium, or vanadium. A gel produced from an alcohol solution including a silicic acid ester that has been subjected to hydrolysis (alcogel) is particularly preferable.

The cross-sectional area of the fibers is preferably 10% or less with respect to the total cross-sectional area of the composite material.

The composite material may include ultrafine fibers that are dispersed in the aerogel matrix.

The fibers used for the fiber bat and the ultrafine fibers are inorganic fibers (e.g., glass fibers or quartz), for example. Identical fibers may be used as the fiber bat and the ultrafine fibers, or different fibers may be used as the fiber bat and the ultrafine fibers.

It is preferable that the composite material include a radiation scattering material such as titanium dioxide, and a heat-absorbing material such as aluminum hydroxide. The composite material preferably includes amorphous silica (aerogel that includes a small amount of organosilane on the surface), glass fibers, titanium dioxide, and aluminum hydroxide.

The thickness of the low-thermal-conductivity heat-insulating material may be appropriately selected (determined) taking account of the member(s) other than the low-thermal-conductivity heat-insulating material, and the installation site. When a formed body formed of inorganic particles is used, the thickness of the low-thermal-conductivity heat-insulating material is normally 10 to 300 mm or 50 to 200 mm. When the thickness thereof is 100 to 125 mm, it is possible to easily to reduce the size of the entire fireproof structure while providing the desired fire resistance. When the composite material is used, the thickness of the low-thermal-conductivity heat-insulating material is normally 10 to 120 mm or 15 to 80 mm.

EXAMPLES

Production Example 1 (Production of First Heat-Absorbing Material)

A xonotlite-type calcium silicate formed body ("Keical-Ace/Super-Silica" manufactured by Nippon Keical Ltd.) (density: 120 kg/$m^3$, thermal conductivity at 500° C.: 0.114 W/(m·K) or less) (length: 600 mm, width: 300 mm, thickness: 50 mm) was used.

The formed body was cut to have a size suitable for use in the examples described later, and allowed to absorb 200 wt % (i.e., a weight twice the weight of the formed body) of water.

The formed body that had absorbed water was sealed (degassed and heat-sealed) using a laminated film (laminate) including (from the surface) nylon (15 μm), aluminum foil (7 μm), and linear low density polyethylene (LLDPE) (40 μm) to obtain a heat-absorbing material (first heat-absorbing material).

The thermal conductivity was measured using a cyclic heat method (see below).

Figure 10:
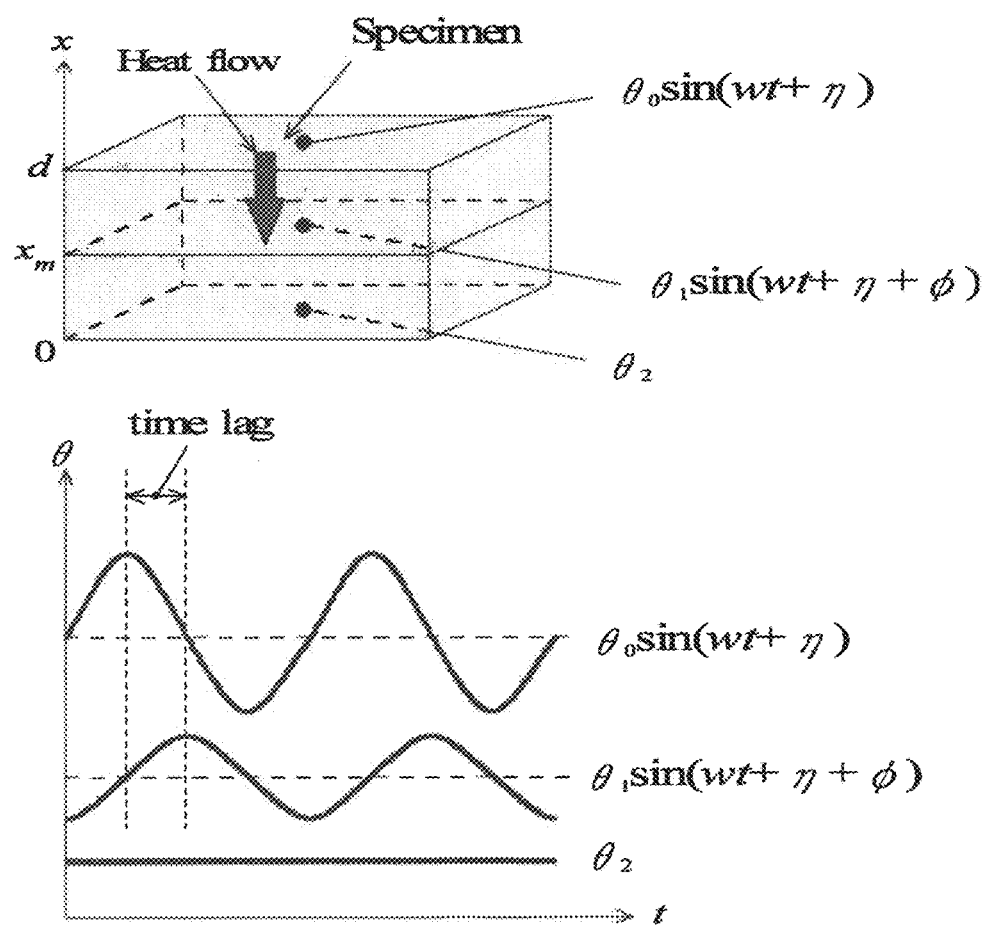
FIG. 10 is a view illustrating a cyclic heat method that is used to measure thermal conductivity.

The cyclic heat method is a method for measuring the thermal diffusivity using an unsteady method. As illustrated in FIG. 10, an x-axis is provided in the thickness direction of a specimen, and the thickness of the specimen is referred to as d (when a one-dimension heat flow in the x-axis direction is measured). It is determined that the heat sinking plane of the specimen is situated at the origin, and the heating plane of the specimen is situated at x=d. It is assumed that the temperature is always maintained to be constant at the origin, and the temperature undergoes a cyclic change $\sin(\omega t+\eta)$ at x=d. $\omega$ is angular frequency, f is cycle, t is time, and $\eta$ is an arbitrary phase. When a one-dimensional heat equation is solved under the above conditions, the thermal wave amplitude ratio A $(=\theta_1/\theta_0)$ and phase difference $\varphi$ with respect to x=d and an arbitrary point $x=x_m$ are determined (see the following expressions).

$$A = \left| \frac{\sinh kx_m(1+i)}{\sinh kd(1+i)} \right| = \left\{ \frac{\cosh 2kx_m - \cos 2kx_m}{\cosh 2kd - \cos 2kd} \right\}^{1/2} \quad (1)$$

$$\phi = \arg\left\{ \frac{\sinh kx_m(1+i)}{\sinh kd(1+i)} \right\} \quad (2)$$

$$k = \sqrt{\frac{\omega}{2\kappa}} \quad (3)$$

where, i is an imaginary unit, and w is defined by the following expression (see (1) H. S. Carslaw and J. C. Jaeger: Conduction of Heat in Solids, Oxford University Press, 105-109 (1959), and (2) Omura, Comparison of thermal conductivities of thermal insulations by different measurement methods, Japan Journal of Thermophysical Properties, 21 [2] 86-96 (2007)).

$$\omega = 2\pi/f \quad (4)$$

The thermal diffusivity can be calculated by comparing the thermal wave with respect to the heating plane and the thermal wave with respect to an arbitrary position $x_m$ inside the specimen, and measuring the amplitude ratio or the phase difference. Specifically, the measured amplitude ratio A is substituted into the expression (1) to calculate k, and the resulting value is substituted into the expression (3) to calculate the thermal diffusivity $\kappa$. Likewise, the phase difference $\varphi$ is substituted into the expression (2), and the thermal diffusivity $\kappa$ is calculated from k and the expression (3). The thermal conductivity $\lambda$ is calculated by substituting the density $\rho$ and the specific heat c measured separately into the following expression.

$$\lambda = \rho c \kappa \quad (5)$$

Production Example 2 (Production of Second Heat-Absorbing Material)

Trimagnesium phosphate octahydrate and No. 3 water glass (sodium silicate) ($Na_2O \cdot nSiO_2 \cdot mH_2O$ (n=3.0 to 3.4)) were mixed in a weight ratio of 91:9, and the mixture was subjected to a granulation process to obtain water-containing particles having an average particle size of 2 to 7 mm. The water-containing particles were dried at 90° C. to remove water. The resulting particles were placed in a glass cloth bag to produce a heat-absorbing material (second heat-absorbing material). The bag had a shape (configuration) in which a plurality of rectangular bags having a length of 160 mm and a width of 160 mm were connected side by side through a connection part (10 mm) (see FIG. 3). The thickness of the bag was 25 mm.

Fireproof Structure According to First Embodiment that Utilizes First Heat-Absorbing Material Example 1

(1) Assembly of Fireproof Structure

Figure 4:
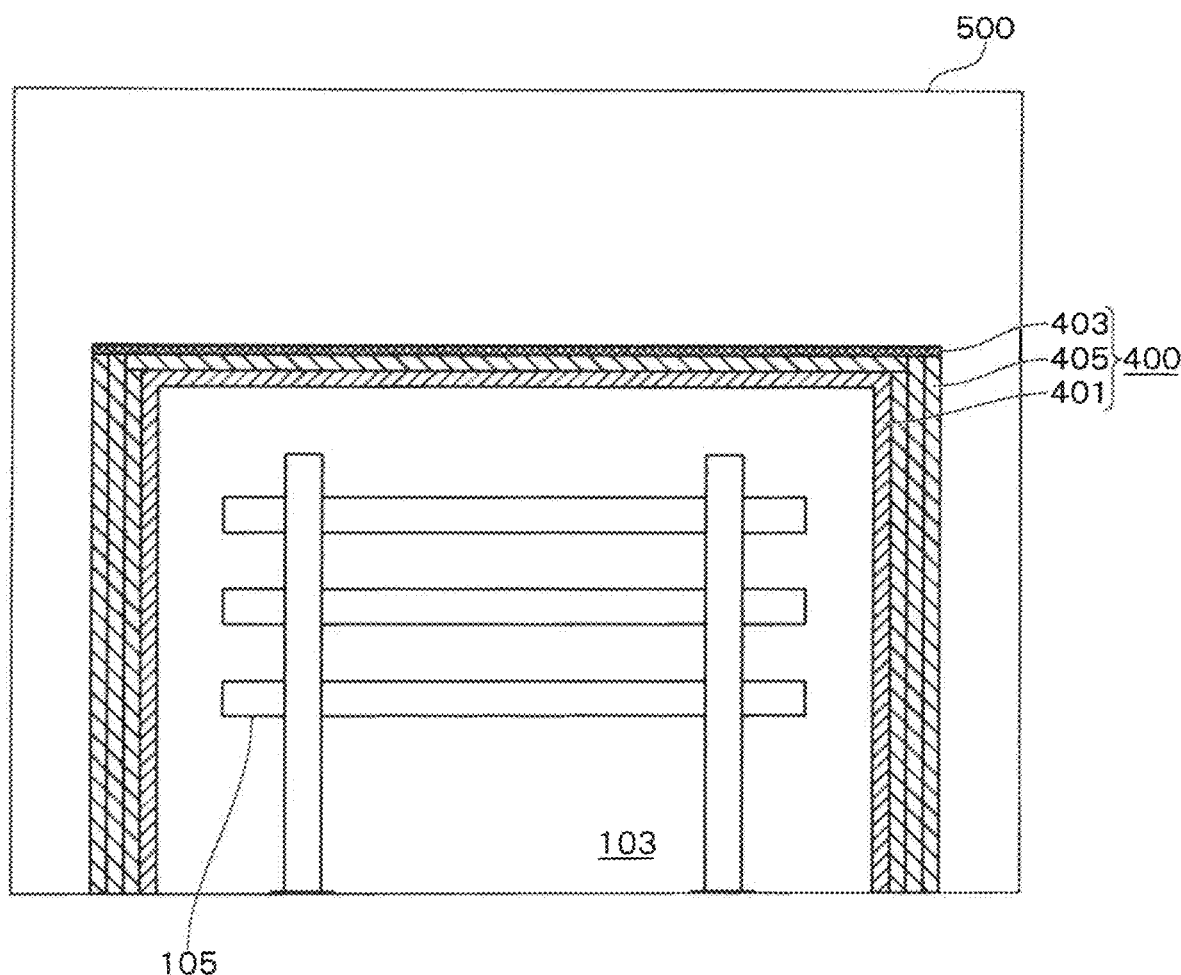
FIG. 4 is a vertical cross-sectional view illustrating the fireproof structure produced in Example 1.

The fireproof structure illustrated in FIGS. 4 and 5 was assembled using the heat-absorbing material (thickness: 25 mm) produced in Production Example 1, a heat-insulating material A (low-thermal-conductivity heat-insulating material) (see below), and a heat-insulating material B (fibrous heat-insulating material) (see below), and subjected to a fire resistance test. Heat-insulating material A: microporous fumed silica formed body ("ROSLIM Board GH" manufactured by Nichias Corporation) (thickness: 100 mm) (thermal conductivity at 800° C.: 0.04 W/(m·K))

Heat-insulating material B: bio-soluble fiber blanket (composition of bio-soluble fibers: $SiO_2$ content: about 73 mass %, CaO content: about 25 mass %, MgO content: about 0.3 mass %, $Al_2O_3$ content: about 2 mass %) (shrinkage ratio (1,100° C., 24 hours):0.6%) (thickness: 25 mm)

The shrinkage ratio was measured as described below.

A blanket (length: 150 mm, width: 100 mm, thickness: 50 mm, density: 130±15 kg/m$^3$) was produced using the fibers. The blanket was calcined at 1,100° C. for 24 hours. The length of the blanket was measured before and after calcination. The ratio of the length of the blanket after calcination with respect to the length of the blanket before calcination was taken as the shrinkage ratio.

A fireproof structure 400 illustrated in FIG. 4 was assembled as described below.

Cable rack supports 105 were secured on a support structure (accessory) to assemble a cable rack 103. A case (not illustrated in FIG. 4) in which cables were placed, was placed on each cable rack support 105.

The angles of a heat-insulating casing were provided, and an inner metal panel was secured to assemble a heat-insulating casing (not illustrated in FIG. 4) in the shape of a rectangular parallelepiped in which only the lower side was open.

The cable rack 103 was placed in a vertical furnace 500, and the heat-insulating casing (not illustrated in FIG. 4) was provided to surround the cable rack 103.

A heat-absorbing material 401 was bonded to the inner metal panel of the heat-insulating casing.

A heat-insulating material A 405 (one layer or three layers) was bonded to the heat-absorbing material 401.

A heat-insulating material B 403 was provided around the heat-insulating material A 405.

An outer metal panel (not illustrated in FIG. 4) of the heat-insulating casing was provided to the outer side of the heat-insulating material B 403 to assemble the fireproof structure 400.

(2) Evaluation of Fireproof Structure

Figure 5:
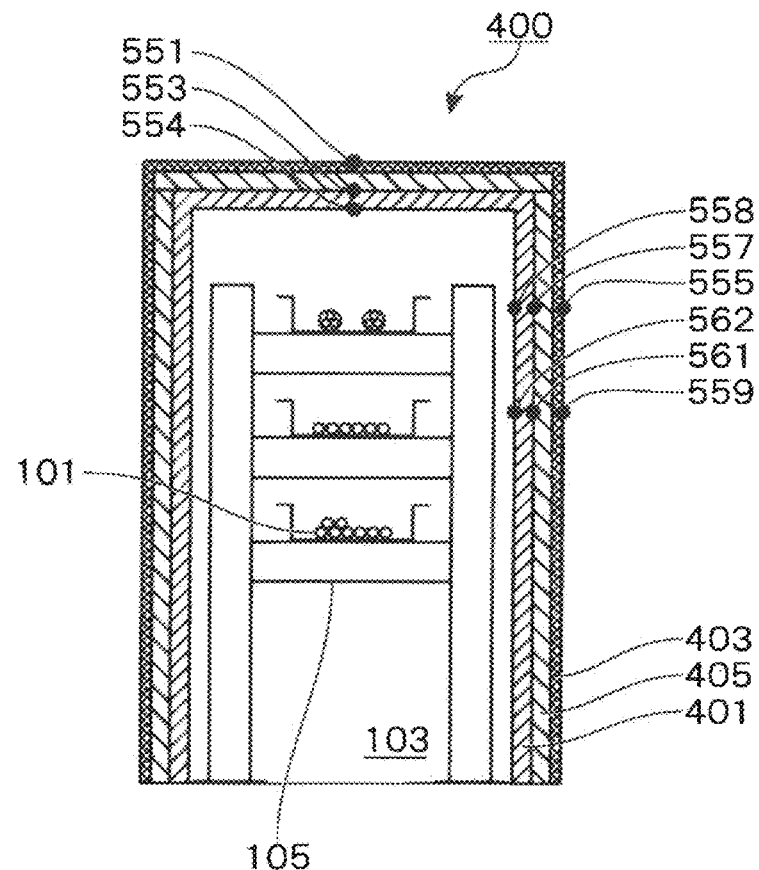
FIG. 5 is a vertical cross-sectional view illustrating the fireproof structure produced in Example 1.

FIG. 5 is a schematic vertical cross-sectional view illustrating the fireproof structure. FIG. 5 illustrates thermocouple installation positions.

Thermocouples were provided to the outer surface of the heat-insulating material B (551, 555, and 559 in FIG. 5), between the heat-absorbing material and the heat-insulating material A (553, 557, and 561 in FIG. 5), and to the inner surface of the heat-absorbing material (554, 558, and 562 in FIG. 5).

The fireproof structure was heated for 3 hours in the vertical furnace 500 using a burner in accordance with the ISO standard fire curve, and allowed to cool for 2 hours.

Table 1 shows the temperature (° C.) measured at each thermocouple installation position when 1, 2, 3, and 5 hours had elapsed.

TABLE 1

|  | 1 hr | 2 hr | 3 hr | (° C.) 5 hr |
|---|---|---|---|---|
| Outer surface of heat-insulating material B (551) | 920 | 1,200 | 1,090 | 120 |
| Between heat-absorbing material and heat-insulating material A (553) | 55 | 90 | 100 | 105 |
| Inner surface of heat-absorbing material (554) | 50 | 80 | 100 | 105 |
| Outer surface of heat-insulating material B (555) | 910 | 1,150 | 1,050 | 190 |
| Between heat-absorbing material and heat-insulating material A (557) | 50 | 75 | 170 | 120 |
| Inner surface of heat-absorbing material (558) | 45 | 60 | 100 | 100 |
| Outer surface of heat-insulating material B (559) | 905 | 1,110 | 1,110 | 190 |
| Between heat-absorbing material and heat-insulating material A (561) | 50 | 80 | 130 | 120 |
| Inner surface of heat-absorbing material (562) | 45 | 60 | 95 | 100 |

Example 2

(1) Assembly of Fireproof Structure

FIG. 6 is a schematic cross-sectional view illustrating a fireproof structure 600 assembled in Example 2.

In Example 2, a cable rack 103 that was suspended from the ceiling was used. The cable rack 103 had a plurality of supports, and a case in which cables 101 were placed was placed on each support.

A heat-absorbing material 601 (thickness: 25 mm) (produced in Production Example 1) was provided to surround the case (in which the cables 101 were placed) that was placed on each support. A heat-insulating material laminate 603 was provided to surround the heat-absorbing material 601. The heat-insulating material laminate 603 had a structure in which a heat-insulating material C (low-thermal-conductivity heat-insulating material) (one layer) (thickness: 20 mm) (see below) and a heat-insulating material B (fibrous heat-insulating material) (three layers) (thickness: 25 mm (×3)) (see below) were stacked (from the side of the cables), and the entire laminate was surrounded by a silica cloth.
Heat-insulating material C: aerogel-inorganic fiber composite material ("Pyrogel" manufactured by Aspen Aerogels) (thermal conductivity at 400° C.: 0.045 to 0.048 W/(m·K))
Heat-insulating material B: bio-soluble fiber blanket (composition of bio-soluble fibers: SiO₂ content: about 73 mass %, CaO content: about 25 mass %, MgO content: about 0.3 mass %, Al₂O₃ content: about 2 mass %)

(2) Evaluation of Fireproof Structure

Thermocouples were provided to the outer surface of the heat-insulating material laminate 603, between the blanket layers of the heat-insulating material laminate 603, between the heat-insulating material laminate 603 and the heat-absorbing material 601, and to a position near the cables 101.

The fireproof structure was heated for 3 hours in accordance with the ISO standard fire curve in the same manner as in Example 1, and allowed to cool for 2 hours. Table 2 shows the temperature (° C.) measured at each thermocouple installation position when 1, 2, 3, and 5 hours had elapsed.

TABLE 2

|  | 1 hr | 2 hr | 3 hr | (° C.) 5 hr |
|---|---|---|---|---|
| Outer surface of heat-insulating material laminate | 950 | 1,050 | 1,100 | 250 |
| Between blanket layers | 800 | 940 | 910 | 350 |
| Between heat-insulating material laminate and heat-absorbing material | 55 | 95 | 175 | 150 |
| Near cable | 28 | 37 | 89 | 97 |

Example 3

A box-like cage was provided around a valve, and a heat-absorbing material (thickness: 25 mm), Pyrogel (heat-insulating material C (see Example 2)) (one layer) (thickness: 20 mm), and a silica-alumina fiber (alumina:silica=50:50) blanket (three layers) (thickness: 25 mm (×3)) were stacked on the cage, and the entire laminate was surrounded by a silica cloth like Example 2.

The heating test was performed in the same manner as in Example 1. The maximum temperature of the valve body that was reached was 104 to 118° C.

Fireproof Structure According to First Embodiment that Utilizes Second Heat-Absorbing Material Example 4

(1) Assembly of Fireproof Structure

Figure 7:
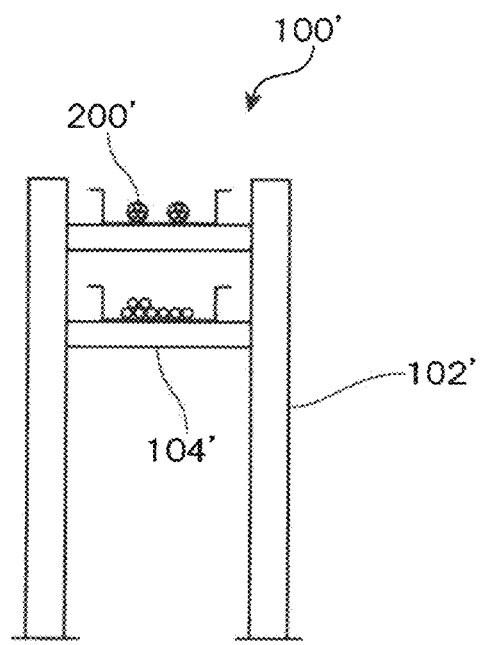
FIG. 7 is a vertical cross-sectional view illustrating the fireproof structure produced in Example 4.
Figure 8:
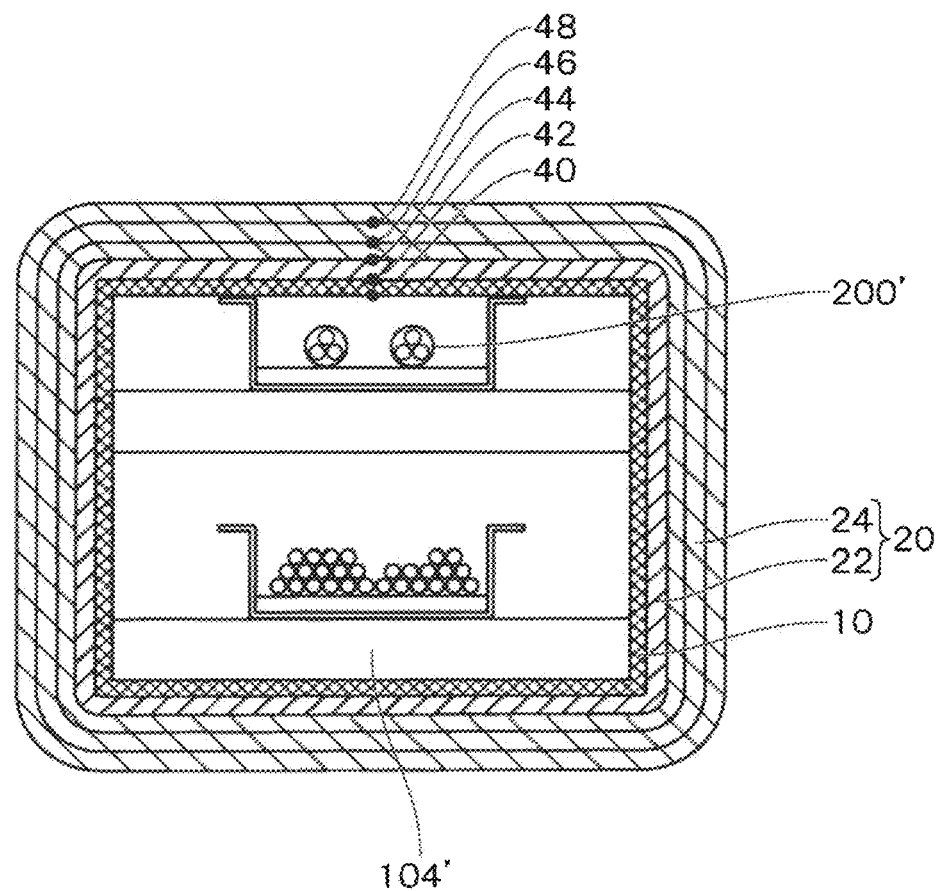
FIG. 8 is a vertical cross-sectional view illustrating the fireproof structure produced in Example 4.

The fireproof structure illustrated in FIGS. 7 and 8 was assembled using the heat-absorbing material produced in Production Example 2, the heat-insulating material B used in Example 1, and the heat-insulating material C used in Example 2, and subjected to a fire resistance test. FIG. 7 is a vertical cross-sectional view illustrating a cable rack used for the experiment on which cables are placed, FIG. 8 is a schematic vertical cross-sectional view illustrating the fireproof structure.

As illustrated in FIG. 7, cable rack supports 104' were secured on a support structure (accessory) in a state in which pedestals 102' stood upright to assemble a cable rack 100'. A case in which cables 200' were placed, was placed on each cable rack support 104'.

As illustrated in FIG. 8, the heat-absorbing material 10 was provided to surround the pedestals 102' and the supports 104'. A heat-insulating material laminate 20 was provided to surround the heat-absorbing material 10. The heat-insulating material laminate 20 had a structure in which the heat-insulating material C 22 (one layer) (thickness: 20 mm) and a heat-insulating material B 24 (three layers) (thickness: 25 mm (×3)) were stacked (from the side of the cables), and the entire laminate was surrounded by a silica cloth.

The cable rack 100' was placed in a vertical furnace.

(2) Evaluation of Fireproof Structure

FIG. 8 illustrates thermocouple installation positions. Thermocouples were provided between the second layer and the third layer (counted from the inner side) of the heat-insulating material B 24 (48 in FIG. 8), between the first layer and the second layer (counted from the inner side) of the heat-insulating material B 24 (46 in FIG. 8), between the heat-insulating material B 24 and the heat-insulating material C 22 (44 in FIG. 8), between the heat-insulating material C 22 and the heat-absorbing material 10 (42 in FIG. 8), and to a position directly above the cable case placed on the upper support (40 in FIG. 8).

The fireproof structure was heated for 3 hours in the vertical furnace using a burner in accordance with the ISO standard fire curve, and allowed to cool for 2 hours. Table 3 shows the temperature (° C.) measured at each thermocouple installation position when 1, 2, 3, 5, 8, and 10 hours had elapsed.

As shown in Table 3, the temperature measured at the position 40 directly above the cable case was about 163° C. (i.e., the continuity of cables was obtained) even when the external temperature exceeded 1,000° C. The temperature measured at the position 40 directly above the cable case was maintained at 100° C. for about 20 minutes when about 3 hours had elapsed from heating. It is considered that this phenomenon occurred due to vaporization of water from the heat-absorbing material.

TABLE 3

| | | | | | | (° C.) |
|---|---|---|---|---|---|---|
| | 1 hr | 2 hr | 3 hr | 5 hr | 8 hr | 10 hr |
| Between second layer and third layer of heat-insulating material B (48) | 650 | 900 | 1,030 | 370 | 155 | 110 |
| Between first layer and second layer of heat-insulating material B (46) | 325 | 750 | 810 | 420 | 195 | 140 |
| Between heat-insulating material B and heat-insulating material C (44) | 150 | 570 | 740 | 390 | 195 | 150 |
| Between heat-insulating material C and heat-absorbing material (42) | 40 | 100 | 240 | 220 | 175 | 160 |
| Directly above cable case (40) | 20 | 70 | 100 | 148 | 163 | 158 |

Example 5

In Example 4, the heat-absorbing material, the heat-insulating material C, and the heat-insulating material B were stacked in this order. In Example 5, a fireproof structure was assembled in the same manner as in Example 4, except that a silica-alumina fiber blanket (heat-insulating material D) (thickness: 25 mm (×3)) (shrinkage ratio (1,100° C., 24 hours):2.4%, shrinkage ratio (1,100° C., 8 hours): 1.4%) was used instead of the heat-insulating material B, and the heat-insulating material C, the heat-absorbing material, and the heat-insulating material D were stacked in this order.

The heating test was performed in the same manner as in Example 4. Table 4 shows the temperature (° C.) measured after 1, 2, 3, and 5 hours had elapsed.

TABLE 4

| | | | | (° C.) |
|---|---|---|---|---|
| | 1 hr | 2 hr | 3 hr | 5 hr |
| Furnace temperature (controlled temperature) or outside fireproof structure | 951 | 1,059 | 1,114 | 169 |
| Between second layer and third layer of heat-insulating material D | 729 | 869 | 940 | 301 |
| Between first layer and second layer of heat-insulating material D | 450 | 664 | 742 | 393 |
| Between heat-absorbing material and first layer of heat-insulating material D | 70 | 212 | 272 | 203 |
| Between heat-insulating material C and heat-absorbing material | 42 | 95 | 109 | 142 |
| Near cable | 43 | 90 | 97 | 118 |

Fireproof Structure According to Second Embodiment

Example 6

A rack on which cables were placed was assembled in the same manner as in Example 1, and a heat-insulating casing was provided.

A ROSLIM Board GH (heat-insulating material A (see Example 1)) (three layers) (total thickness: 100 mm) was bonded to both side surfaces in the longitudinal direction and the upper surface of the heat-insulating casing on the inner side, and a bio-soluble fiber blanket (heat-insulating material B (see Example 1)) (thickness: 25 mm) was provided around the ROSLIM Board GH. A ROSLIM Board GH (four layers) (total thickness: 200 mm) was bonded to both side surfaces in the transverse direction on the inner side.

The heating test was performed in the same manner as in Example 1. The maximum temperature of the surface of the cables that was reached was about 140° C.

Example 7

Figure 9:
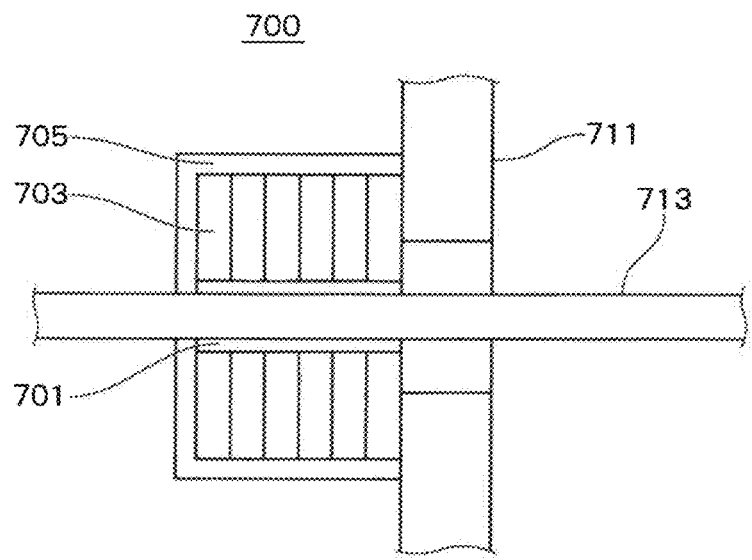
FIG. 9 is a vertical cross-sectional view illustrating the fireproof structure produced in Example 7.

FIG. 9 is a schematic vertical cross-sectional view illustrating a fireproof structure 700 assembled in Example 7.

The fireproof structure 700 illustrated in FIG. 9 is used for a pipe 713 that passes through a wall 711. The fireproof structure 700 had a configuration in which the pipe 713 was covered with silica-alumina fibers 701 (thickness: 10 to 25 mm), and a ROSLIM Board GH 703 (heat-insulating material A) (six layers) (total thickness: 300 mm) was provided around the silica-alumina fibers 701 in the shape of a doughnut. The total thickness of the silica-alumina fibers 701 and the ROSLIM Board GH 703 surrounding the pipe 713 was 75 mm. The resulting structure was covered with a silica-alumina fiber blanket 705 (thickness: 25 to 100 mm).

The heating test was performed in the same manner as in Example 1. The maximum temperature of the pipe that was reached was about 113° C.

In Example 7, six ROSLIM Boards GH were stacked. For example, up to ten ROSLIM Boards GH may be stacked.

Example 8

A joint was provided to the fireproof structure of Example 7 in order to improve the sealing capability.

Specifically, a rubber joint ("Bellow-Q" manufactured by Nichias Corporation) was provided to the wall so as to surround the pipe passing through the wall, and covered with silica-alumina fibers. A ROSLIM Board GH (six layers) (total thickness: 300 mm) was stacked thereon, and the resulting structure was covered with a silica-alumina fiber blanket (thickness: 25 to 100 mm) in a similar way to Example 7.

The heating test was performed in the same manner as in Example 1. The maximum temperature around the electric wire pipe that was reached was about 113° C.

The sealing capability with respect to water and the like in case of emergency is improved by providing a joint, and safety is improved.

INDUSTRIAL APPLICABILITY

The fireproof structure according to the invention may be used for a cable used in a nuclear plant, and the like.

Although only some exemplary embodiments and/or examples of this invention have been described in detail above, those skilled in the art will readily appreciated that many modifications are possible in the exemplary embodiments and/or examples without materially departing from the novel teachings and advantages of this invention. Accordingly, all such modifications are intended to be included within the scope of this invention.

The documents described in the specification and the specification of Japanese patent application on which Paris convention priority is claimed are incorporated herein by reference in its entirety.

The invention claimed is:

1. A fireproof structure comprising:
   (i) a first heat-absorbing material that comprises an inorganic porous formed body that has absorbed water and is packed in a packing material that breaks at 70 to 130° C., the inorganic porous formed body being a formed body that comprises an inorganic powder composed of a calcium silicate, or (ii) a second heat-absorbing material that comprises particles that comprise magnesium phosphate hydrate and a binder; and
   a fibrous heat-insulating material that comprises inorganic fibers having a shrinkage ratio of 5% or less when allowed to stand at 1,100° C. for 24 hours.

2. The fireproof structure according to claim 1, wherein the binder included in the second heat-absorbing material is sodium silicate.

3. The fireproof structure according to claim 1, wherein the second heat-absorbing material is held by a heat-resistant cloth having a surface on which aluminum is deposited.

4. The fireproof structure according to claim 1, further comprising:
   a low-thermal-conductivity heat-insulating material that has a thermal conductivity at 400° C. of 0.05 W/(m·K) or less,
   wherein the heat-absorbing material, the low-thermal-conductivity heat-insulating material, and the fibrous heat-insulating material are provided in this order.

5. The fireproof structure according to claim 1, further comprising:
   a low-thermal-conductivity heat-insulating material that has a thermal conductivity at 400° C. of 0.05 W/(m·K) or less,
   wherein the low-thermal-conductivity heat-insulating material, the heat-absorbing material, and the fibrous heat-insulating material are provided in this order.

6. The fireproof structure according to claim 4, the fireproof structure being a laminate in which two or three members selected from the heat-absorbing material, the low-thermal-conductivity heat-insulating material, and the fibrous heat-insulating material are stacked, the laminate being packed in a package.

7. The fireproof structure according to claim 6, wherein the laminate is a combinable unit structure.

8. The fireproof structure according to claim 6, wherein the laminate has a density of 200 to 300 kg/m$^3$.

9. The fireproof structure according to claim 6, wherein the laminate has a thickness of 100 to 150 mm.

10. The fireproof structure according to claim 4, wherein the low-thermal-conductivity heat-insulating material is a formed body that comprises inorganic particles that are silica particles, alumina particles, or a combination of silica particles and alumina particles, or a composite material that comprises an aerogel and inorganic fibers.

11. The fireproof structure according to claim 10, wherein the formed body that comprises the inorganic particles comprises one or more materials selected from reinforcing fibers and a radiation scattering material.

12. The fireproof structure according to claim 1, wherein the inorganic fibers having a shrinkage ratio of 5% or less when allowed to stand at 1,100° C. for 24 hours, are ceramic fibers, or bio-soluble fibers having a dissolution rate of 1% or more with respect to a physiological saline solution.

13. The fireproof structure according to claim 1, wherein, when a protection target is surrounded by the fireproof structure, and heated at 1,100° C. for 3 hours from the outside of the fireproof structure, the protection target that is situated inside the fireproof structure has a surface temperature of 170° C. or less.

14. A method for using the fireproof structure according to claim 1, comprising surrounding a protection target using the fireproof structure according to claim 1 so that the fibrous heat-insulating material is situated on the outer side.

15. The method according to claim 14, wherein the fireproof structure is provided to a surface of a structure.

* * * * *